(12) United States Patent  (10) Patent No.: US 8,247,508 B2
Takashima et al.  (45) Date of Patent: Aug. 21, 2012

(54) ISOBUTYLENE-BASED POLYMER AND METHOD FOR PRODUCING SAME

(75) Inventors: Tsutomu Takashima, Tokyo (JP); Akira Shiibashi, Tokyo (JP); Tsuyoshi Yamaguchi, Tokyo (JP)

(73) Assignee: JX Nippon Oil & Energy Corporation, Tokyo (JP)

( * ) Notice: Subject to any disclaimer, the term of this patent is extended or adjusted under 35 U.S.C. 154(b) by 0 days.

(21) Appl. No.: 13/322,500

(22) PCT Filed: May 27, 2010

(86) PCT No.: PCT/JP2010/059012
§ 371 (c)(1),
(2), (4) Date: Feb. 13, 2012

(87) PCT Pub. No.: WO2010/137655
PCT Pub. Date: Dec. 2, 2010

(65) Prior Publication Data
US 2012/0136130 A1    May 31, 2012

(30) Foreign Application Priority Data
May 29, 2009 (JP) ................... 2009-130820

(51) Int. Cl.
C08F 216/16 (2006.01)
C08F 210/10 (2006.01)
C08F 4/14 (2006.01)

(52) U.S. Cl. ........ 526/282; 526/238; 526/309; 526/334; 526/348.7

(58) Field of Classification Search ........... 526/238, 526/282, 309, 334, 348.7
See application file for complete search history.

(56) References Cited

U.S. PATENT DOCUMENTS

| | | | |
|---|---|---|---|
| 3,644,315 A | 2/1972 | Gardner et al. | |
| 4,316,973 A | 2/1982 | Kennedy | |
| 4,524,187 A | 6/1985 | Greco et al. | |
| 4,758,631 A | 7/1988 | Kennedy et al. | |
| 4,904,732 A | 2/1990 | Iwahara et al. | |
| 5,084,498 A | 1/1992 | Van Gulick | |
| 5,290,873 A | 3/1994 | Noda et al. | |
| 2009/0087607 A1* | 4/2009 | Noda et al. | 428/36.9 |

FOREIGN PATENT DOCUMENTS

| | | |
|---|---|---|
| JP | 63-6041 | 1/1988 |
| JP | 63-105005 | 5/1988 |
| JP | 4-288309 | 10/1992 |
| JP | 4-366154 | 12/1992 |
| JP | 2005-113049 | 4/2005 |
| JP | 2008-260915 | 10/2008 |
| JP | 2009-256554 | 11/2009 |

OTHER PUBLICATIONS

Machine translation of JP 2005-113049; publication date: Apr. 2005.*
Machine translation of JP 2008-260915; publication date: Oct. 2008.*
International Preliminary Report for International Application No. PCT/JP2010/059012, mail date is Dec. 22, 2011.
Search report from International Application No. PCT/JP2010/059012, mail date is Aug. 10, 2010.

* cited by examiner

*Primary Examiner* — Fred M Teskin
(74) *Attorney, Agent, or Firm* — Greenblum & Bernstein, P.L.C.

(57) ABSTRACT

An isobutylene-based polymer comprising a structural unit represented by the following formula (1):

[Chemical Formula 1]

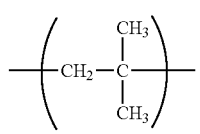

(1)

and a structural unit represented by the following formula (2):

[Chemical Formula 2]

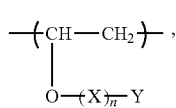

(2)

wherein X represents a divalent group; Y represents a substituted or unsubstituted alicyclic group having an unsaturated bond in the ring; and n represents 0 or 1.

7 Claims, 2 Drawing Sheets

Fig.1

BEFORE PORYMERIZATION (7-a)

AFTER PORYMERIZATION (9-b)

(9-a)

ISOBUTYLENE-BASED POLYMER AND METHOD FOR PRODUCING SAME

TECHNICAL FIELD

The present invention relates to an isobutylene-based polymer and a method for producing the same.

BACKGROUND ART

As methods for introducing cross-linkable groups into isobutylene-based polymers, Patent Literatures 1 to 4 describe methods for introducing cross-linkable silicon groups into isobutylene-based polymers. Patent Literatures 5 to 7 also describe methods which involve introducing unsaturated groups into ends of polyisobutylenes. In addition, Patent Literature 8 describes a method which involves copolymerizing isobutylene with a non-conjugated diene such as 1,9-decadiene.

Patent Literatures 9 and 10 describe alicyclic vinyl ether polymers.

CITATION LIST

Patent Literature

Patent Literature 1: U.S. Pat. No. 3,644,315
Patent Literature 2: U.S. Pat. No. 4,524,187
Patent Literature 3: U.S. Pat. No. 4,904,732
Patent Literature 4: Japanese Patent Application Laid-Open No. 63-6041
Patent Literature 5: U.S. Pat. No. 4,316,973
Patent Literature 6: U.S. Pat. No. 4,758,631
Patent Literature 7: Japanese Patent Application Laid-Open No. 63-105005
Patent Literature 8: Japanese Patent Application Laid-Open No. 04-288309
Patent Literature 9: Japanese Patent Application Laid-Open No. 2005-113049
Patent Literature 10: Japanese Patent Application Laid-Open No. 2008-260915

SUMMARY OF INVENTION

Technical Problem

Butyl rubber (IIR) has a high tan δ ("loss tangent" considered as an index reflecting a vibrational absorption property in dynamic viscoelasticity measurement) in a wide temperature region and particularly has the property of having a high tan δ at 0° C. Thus, it is expected as a material excellent in grip performance and suitable for the improvement of wet braking. However, butyl rubber contains less double bonding, and problems thereof are that it has reduced cross-linkability, is not sufficiently reinforced by carbon black, is inferior in abrasion resistance and has increased viscosity.

Although having a lower molecular weight than that of butyl rubber, an isobutylene-based polymer is similarly excellent in viscoelasticity, weather resistance, gas impermeability and the like. Accordingly, studies have recently been carried out for improving weather resistance, gas impermeability and the like by blending isobutylene-based polymers in diene-based rubbers such as butadiene rubber (BR) or styrene-butadiene rubber (SBR) to introduce polyisobutyrene skeletons in the compositions and are expected as providing methods for improving rubber performance. When it is intended to improve the above performances, a rubber-like cured product is typically formed by blending an isobutylene-based polymer having an average of more than one unsaturated group per molecule in the composition, followed by cross-linking and curing.

Examples of the isobutylene-based polymer having an average of more than one unsaturated group per molecule include one obtained by copolymerizing isobutylene with a compound having conjugated double bond (see Patent Literatures 1 and 2). However, the isobutylene-based polymer has double bonds in the main chain and is a polymer inferior in weather resistance, chemical resistance and reactivity.

It is also known that cross-linkable silicon groups can be used as the unsaturated groups in the isobutylene-based polymer to make a moisture-curable polymer (the so-called silane cross-linking method) (see Patent Literatures 3 and 4). However, this case requires an expensive raw material (a silylation agent).

Polymers each having unsaturated groups at the molecular chain ends include one obtained by utilizing an inifer method involving subjecting isobutylene to cationic polymerization using 1,4-bis(α-chloroisopropyl)benzene (hereinafter referred to as "p-DCC") as an initiator and chain transfer agent and $BCl_3$ as a catalyst and subjecting the resulting polymer having a chlorine atom at the end to further reaction (see Patent Literatures 5, 6 and 7). To obtain such a polymer, a plurality of steps are required and an expensive raw material (a silylation agent) is also necessary.

In introducing a vinyl group into the end of an isobutylene-based polymer, a method involving copolymerizing a universal and inexpensively available non-conjugated diene such as, for example, 1,9-decadiene as a raw material is also known as a method capable of introducing even at least two vinyl groups depending on the reaction conditions (see Patent Literature 8). However, when an isobutylene-based polymer is produced according to the method described in Patent Literature 8, depending on the conditions of an initiator, a catalyst, the reaction temperature, and the like, there are problems: a by-product due to proton initiation is abundantly formed, an indanyl type by-product is abundantly formed when p-DCC is used to perform modification, etc.

As described above, the fact is that a suitable isobutylene-based polymer having a sufficient amount of unsaturated groups to enable the control of the cross-linking degree in cross-linking and curing with rubber and a suitable, relatively simple method for producing an isobutylene-based polymer appropriate to the purpose have not yet been found.

More recently, polymers using new, cationically polymerizable vinyl ethers having unsaturated groups in the side chains have become known (see Patent Literatures 9 and 10). The features of these polymers obtained by vinyl ether polymerization include that their unsaturated groups in the side chains are not responsible for the reaction and retained as they are probably because the polymerization of the vinyl group of each vinyl ether rapidly proceeds. The polymerization temperature of a vinyl ether is generally said to be –10 to 50° C., depending on the target molecular weight and the catalyst; according to examples therein, the vinyl ethers having unsaturated groups in the side chains are each polymerized at such a temperature.

On the other hand, for the cationic polymerization of a hydrocarbon-based vinyl compound such as isobutylene, side reactions such as chain transfer reaction and termination reaction tend to occur stemming from unstable growing carbon cations. Accordingly, for the cationic polymerization, a Lewis acid catalyst such as titanium tetrachloride is generally used to carry out the polymerization at a temperature as low as –70° C. or less in order to stabilize growing carbon cations and inhibit side reactions. Probably because of different suitable polymerization conditions (polymerization temperature), no example of the copolymerization of a vinyl ether-based monomer and a hydrocarbon-based vinyl monomer, although they are the same cationic polymerizable monomers, is reported except block copolymerization examples in each of which living polymerization is used to polymerize them separately (for example, a vinyl ether is first homopolymerized under polymerization conditions suitable therefor, followed by homopolymerizing a hydrocarbon-based vinyl monomer).

Made in view of these circumstances, the present invention has an object of providing a new polyisobutylene-based polymer having a sufficient cross-linking curability and useful in introducing a polyisobutylene skeleton into a rubber composition and a method for producing the same.

Solution to Problem

To achieve the above object, the present inventors have studied the synthesis of a new isobutylene-based polymer having unsaturated groups in its side chains. As a result, the previously unattempted copolymerization of monomers of different reactivity in which isobutylene is cationically copolymerized with a vinyl ether having a particular unsaturated group in its side chains, which surprisingly proceeds, has been found to provide a completely new type of copolymer having a predetermined molecular weight and retaining the unsaturated groups in its side chains as they are. In addition, it has been demonstrated that the copolymer can be cross-linked and cured to introduce a polyisobutylene skeleton into a composition comprising rubber and the like; thereby, the present invention is accomplished.

Thus, the present invention provides an isobutylene-based polymer comprising a structural unit represented by the following formula (1):

[Chemical Formula 1]

(1)

and a structural unit represented by the following formula (2):

[Chemical Formula 2]

(2)

wherein X represents a divalent group; Y represents a substituted or unsubstituted alicyclic group having an unsaturated bond in the ring; and n represents 0 or 1.

The isobutylene-based polymer of the present invention preferably has a weight average molecular weight of 500 to 500,000.

The isobutylene-based polymer of the present invention also preferably contains substantially no unsaturated bond in the main chain.

The isobutylene-based polymer of the present invention also preferably has a random copolymer chain of a structural unit represented by the above formula (1) and a structural unit represented by the above formula (2).

In addition, the isobutylene-based polymer of the present invention preferably comprises a structural unit represented by the following formula (3):

[Chemical Formula 3]

(3)

wherein n represents 0 or 1, and/or a structural unit represented by the following formula (4):

[Chemical Formula 4]

(4)

wherein n represents 0 or 1, as the structural unit represented by the above formula (2).

In addition, the present invention provides a method for producing an isobutylene-based polymer, comprising copolymerizing isobutylene and a cationically polymerizable monomer containing a vinyl ether represented by formula (5):

$$CH_2=CH-O-(X)_n-Y \qquad (5),$$

wherein X represents a divalent group; Y represents a substituted or unsubstituted alicyclic group having an unsaturated bond in the ring; and n represents 0 or 1, in the presence of a Lewis acid to provide an isobutylene-based polymer comprising a structural unit represented by the following formula (1):

[Chemical Formula 5]

(1)

and a structural unit represented by the following formula (2):

[Chemical Formula 6]

(2)

wherein X represents a divalent group; Y represents a substituted or unsubstituted alicyclic group having an unsaturated bond in the ring; and n represents 0 or 1.

In the method for producing an isobutylene-based polymer according to the present invention, the above Lewis acid is preferably boron trifluoride or a boron trifluoride complex. The use of such a Lewis acid enables the molecular weight to be easily controlled by changing the reaction temperature.

Advantageous Effects of Invention

According to the present invention, there can be provided a new polyisobutylene-based polymer having a sufficient cross-linking curability and useful in introducing a polyisobutylene skeleton into a rubber composition and a method for producing the same.

DESCRIPTION OF EMBODIMENTS

The isobutylene-based polymer of the present invention comprises a structural unit represented by the above formula (1) and a structural unit represented by the above formula (2).

In the above formula (2), the divalent group represented by X plays a function as a linking group between the ether oxygen (O) and Y in the formula. The divalent group represented by X is preferably an alkylene group, an alkyleneoxy group, or an alkyleneoxyalkyl group. n represents 0 or 1, and the case where n is 0 results in a structure in which the ether oxygen (O) is directly attached to Y.

In the above formula (2), Y represents a substituted or unsubstituted alicyclic group having an unsaturated bond in the ring. The alicyclic group Y may be monocyclic, fused polycyclic, or cross-linked polycyclic provided that it has an unsaturated bond in the ring. The isobutylene-based polymer of the present invention preferably has substantially no unsaturated bond in the main chain, while it may have an additional unsaturated bond besides the unsaturated bond in the ring of the alicyclic group Y in each side chain.

Specific examples of the alicyclic group Y include a norbornenyl group, a tricyclodecenyl group, a tetracyclodecenyl group, a tetracyclododecenyl group, and a pentacyclopentadecenyl group; examples of the monocyclic alicyclic group include a cyclohexenyl group, a cyclooctenyl group, and a cyclododecenyl group. These are compounds having ring structures formed by carbon atoms and having carbon-carbon double bonds in the rings; among these, preferred are those containing no polar group, namely, constructed of only carbon and hydrogen atoms. The alicyclic group Y preferably has a carbon number of 6 to 15, more preferably 7 to 10. A carbon number of the alicyclic group Y of less than 6 tends to make the formation of a cyclic compound difficult, and more than 15 tends to make the availability of raw materials per se of a cyclic compound difficult.

The structural unit represented by the above formula (2) may be substituted or unsubstituted in the alicyclic group Y and is particularly preferably a structural unit represented by the above formula (3) and/or a structural unit represented by the above formula (4).

According to the isobutylene-based polymer of the present invention, the copolymerization ratio between a structural unit represented by the above formula (1) and a structural unit represented by the above formula (2) is not particularly limited; however, the molar ratio of the structural unit represented by the above formula (2) is preferably 0.1 to 99 mol %, more preferably 1 to 90 mol %, still more preferably 2 to 80 mol % based on the total amount of both structural units. As used herein, the copolymerization ratio is an average copolymerization ratio per molecule and can be determined by measuring and comparing the intensities of resonance signals of the carbons belonging to the structures by a $^{13}$C-NMR (500 MHz) method.

In the isobutylene-based polymer of the present invention, the form of polymerization between a structural unit represented by the above formula (1) and a structural unit represented by the above formula (2) may be of a block copolymer type or of a random copolymer type. For a conventional isobutylene-based polymer, it has been difficult to subject monomers of different reactivity to random copolymerization; however, the present invention enables even a random copolymer to be effectively obtained because it adopts the combination of a structural unit represented by the above formula (1) and a structural unit represented by the above formula (2).

The isobutylene-based polymer of the present invention may consist only of a structural unit represented by the above formula (1) and a structural unit represented by the above formula (2); however, it may further have a structural unit different from the two structural units. For example, the isobutylene-based polymer obtained by the method of the present invention may be subsequently subjected to block copolymerization with a cationically polymerizable monomer other than isobutylene therewith. When the block copolymer is produced, it preferably has blocks each consisting mainly of an aromatic vinyl compound (that is, blocks each comprising 50% by weight or more of the aromatic vinyl compound); more preferably, the aromatic vinyl compound is a styrene-based one.

The isobutylene-based polymer of the present invention preferably has a weight average molecular weight of 500 to 500,000, more preferably 700 to 300,000, still more preferably 1,000 to 200,000. As used herein, the weight average molecular weight means the weight average molecular weight (Mw) measured by the GPC method.

The above method for producing an isobutylene-based polymer according to the present invention is not particularly limited; however, preferred is a method which involves copolymerizing isobutylene with a cationically polymerizable monomer containing a vinyl ether represented by the above formula (5) in the presence of a Lewis acid.

The vinyl ether represented by the above formula (5) is preferably a monomer having a norbornenyl alicyclic group containing no polar group, that is, constructed of only carbon and hydrogen atoms, and having an unsaturated bond in the ring as the substituent Y.

Specific examples of the norbornenyl alicyclic group containing no polar group include dicyclopentadienyl alicyclic groups such as dicyclopentadienyl, methyldicyclopentadienyl and dihydrodicyclopentadienyl (also called tricyclo[5.2.1.0$^{2,6}$]deca-8-enyl) groups; tetracyclododecenyl alicyclic groups such as tetracyclo[6.2.1.1$^{3,6}$.0$^{2,7}$]dodeca-4-enyl, 9-methyltetracyclo[6.2.1.1$^{3,6}$.0$^{2,7}$]dodeca-4-enyl, 9-ethyltetracyclo[6.2.1.1$^{3,6}$.0$^{2,7}$]dodeca-4-enyl, 9-cyclohexyltetracyclo[6.2.1.1$^{3,6}$.0$^{2,7}$]dodeca-4-enyl, 9-cyclopentyltetracyclo[6.2.1.1$^{3,6}$.0$^{2,7}$]dodeca-4-enyl, 9-methylenetetracyclo[6.2.1.1$^{3,6}$.0$^{2,7}$]dodeca-4-enyl, 9-ethylidenetetracyclo[6.2.1.1$^{3,6}$.0$^{2,7}$]dodeca-4-enyl, 9-vinyltetracyclo[6.2.1.1$^{3,6}$.0$^{2,7}$]dodeca-4-enyl, 9-propenyltetracyclo[6.2.1.1$^{3,6}$.0$^{2,7}$]dodeca-4-enyl, 9-cyclohexenyltetracyclo[6.2.1.1$^{3,6}$.0$^{2,7}$]dodeca-4-enyl, 9-cyclopentenyltetracyclo[6.2.1.1$^{3,6}$.0$^{2,7}$]dodeca-4-enyl and 9-phenyltetracyclo[6.2.1.1$^{3,6}$.0$^{2,7}$]

dodeca-4-enyl groups; norbornenyl alicyclic groups such as 2-norbornenyl, 5-methyl-2-norbornenyl, 5-ethyl-2-norbornenyl, 5-butyl-2-norbornenyl, 5-hexyl-2-norbornenyl, 5-decyl-2-norbornenyl, 5-cyclohexyl-2-norbornenyl, 5-cyclopentyl-2-norbornenyl, 5-ethylidene-2-norbornenyl, 5-vinyl-2-norbornenyl, 5-propenyl-2-norbornenyl, 5-cyclohexenyl-2-norbornenyl, 5-cyclopentenyl-2-norbornenyl, 5-phenyl-2-norbornenyl, tetracyclo[9.2.1.0$^{2,10}$.0$^{3,8}$]tetradeca-3,5,7,12-tetraenyl (also called 1,4-methano-1,4,4a,9a-tetrahydro-9H-fluorenyl) and tetracyclo[10.2.1.0$^{2,11}$.0$^{4,9}$] pentadeca-4,6,8,13-tetraenyl (also called 1,4-methano-1,4,4a,9,9a,10-hexahydroanthracenyl) groups; and pentacyclic or higher cyclic olefin acyclic groups such as pentacyclo[6.5.1.1$^{3,6}$.0$^{2,7}$.0$^{9,13}$]pentadeca-4,10-dienyl, pentacyclo[9.2.1.1$^{4,7}$.0.0$^{2,10}$.0$^{3,8}$]pentadeca-5,12-dienyl and hexacyclo [6.6.1.1$^{3,6}$.0.1$^{10,13}$.0$^{2,7}$.0$^{9,14}$]heptadeca-4-enyl groups.

The amount of the vinyl ether added to the polymerization system is preferably 0.01- to 100-fold moles based on the number of moles of the isobutylene monomer used. Before the polymerization reaction of the above cationically polymerizable monomer, it is preferable to stir a raw material mixture containing the cationically polymerizable monomer so that it is made uniform.

According to the copolymerization reaction according to the present invention, a Lewis acid is used as a polymerization catalyst. The Lewis acid may be widely used from among known ones usable for cationic polymerization. Non-limiting examples thereof include boron halide compounds such as boron trichloride, boron trifluoride, and a diethyl ether complex of boron trifluoride; titanium halide compounds such as titanium tetrachloride, titanium tetrabromide, and titanium tetraiodide; tin halide compounds such as tin tetrachloride, tin tetrabromide, and tetraiodide; aluminum halide compounds such as aluminum trichloride, alkyldichloroaluminums, and dialkylchloroaluminum; antimony halide compounds such as antimony pentachloride and antimony pentafluoride; tungsten halide compounds such as tungsten pentachloride; molybdenum halide compounds such as molybdenum pentachloride; tantalum halide compounds such as tantalum pentachloride; and metal alkoxides such as tetraalkoxy titanium. Among these Lewis acids, preferred are boron trifluoride, aluminum trichloride, ethyldichloroaluminum, tin tetrachloride, titanium tetrachloride, and the like. Among these Lewis acids, boron trifluoride is also preferable in view of enabling the molecular weight to be easily controlled by changing the reaction temperature.

The Lewis acid can be used in an amount of 0.01 to 1,000 millimolar equivalent, preferably 0.05 to 500 millimolar equivalent, based on 1 mole of a raw material monomer.

The above Lewis acid may also be used in the form of a complex in which a polar compound such as alcohol is co-ordinated (hereinafter referred to as a "Lewis acid complex"). A compound forming a complex by being thus co-ordinated to a Lewis acid is also called a complexing agent.

Examples of the above complexing agent co-ordinated to a Lewis acid include polar compounds including oxygenated compounds such as water, an alcohol, an ether, a phenol, a ketone, an aldehyde, an ester, an organic acid, and an acid anhydride; and nitrogen-containing compounds such as an amine.

The alcohol used as a complexing agent is preferably an aliphatic alcohol having 1 to 20 carbons or an aromatic alcohol, more preferably an aliphatic alcohol having 1 to 20 carbons. Examples of the aliphatic alcohol having 1 to 20 carbons include methanol, ethanol, propanol, butanol, pentanol, hexanol, heptanol, octanol, nonanol, decanol, and cyclohexanol. The aliphatic alcohol having 1 to 20 carbons may be linear or branched in the carbon skeleton and may have a ring. The aromatic alcohol indicates an alcohol having an aromatic ring in the molecule; examples thereof include benzyl alcohol.

Examples of the ether used as a complexing agent include an ether having an aromatic or C1 to C20 aliphatic hydrocarbon group. Specific examples thereof include dimethyl ether, diethyl ether, methyl ethyl ether, dipropyl ether, methyl propyl ether, ethyl propyl ether, dibutyl ether, methyl butyl ether, ethyl butyl ether, propyl butyl ether, dipentyl ether, phenyl methyl ether, phenyl ethyl ether, diphenyl ether, cyclohexyl methyl ether, and cyclohexyl ethyl ether. The ether having a C1 to C20 aliphatic hydrocarbon may be linear or branched in the hydrocarbon group which may be a group having a ring.

The phenol used as a complexing agent is preferably a 1- to 3-valent phenol; specifically, phenol, cresol, or the like is preferable.

The ketone used as a complexing agent is preferably a ketone having an aromatic or C1 to C6 aliphatic hydrocarbon group. Specific examples thereof include methyl ethyl ketone, diethyl ketone, methyl butyl ketone, and cyclohexanone. The ketone having a C1 to C6 aliphatic hydrocarbon group may be linear or branched in the hydrocarbon group which may be a group having a ring.

Examples of the ester used as a complexing agent include a carboxylic acid ester and a phosphoric acid ester. The carboxylic acid ester is preferably one in which an aromatic or C1 to C6 aliphatic alcohol and an aromatic or C1 to C6 aliphatic carboxylic acid form an ester bond with one another. Examples of the carboxylic acid ester include methyl formate, ethyl formate, methyl acetate, ethyl acetate, propyl acetate, butyl acetate, pentyl acetate, hexyl acetate, ethyl hexanoate, and ethyl benzoate. The phosphoric acid ester is preferably one obtained by the dehydration condensation of an aromatic or C1 to C6 aliphatic alcohol and phosphoric acid. Examples of the phosphoric acid ester include a complete ester of phosphoric acid such as tributyl phosphoric acid ester. Here, each of the C1 to C6 aliphatic alcohol and the C1 to C6 aliphatic carboxylic acid may be linear or branched in the carbon skeleton and may have a ring.

Examples of the organic acid used as a complexing agent include an aromatic or C1 to C6 aliphatic carboxylic acid, a fluorine-substituted product thereof, phosphoric acid, and a partial ester of phosphoric acid and an aromatic or C1 to C6 aliphatic alcohol. Specific examples thereof include formic acid, acetic acid, propionic acid, oxalic acid, malonic acid, benzoic acid, and diethylphosphoric acid ester. Here, each of the C1 to C6 aliphatic alcohol and the C1 to C6 aliphatic carboxylic acid may be linear or branched in the carbon skeleton and may have a ring.

These complexing agents may be used singly or by mixing two or more thereof in a proper proportion in each complex system. The Lewis acid complex can be produced according to a known method. In addition, the usage amount of the Lewis acid complex may be similar to the above-described usage amount of the Lewis acid.

The Lewis acid complex is preferably a boron trifluoride complex obtained by co-ordinating the above complexing agent to boron trifluoride. An alcohol complex of boron trifluoride is more preferable. The use of such a Lewis acid complex enables the molecular weight to be easily controlled by changing the reaction temperature.

In addition, when living cationic polymerization is carried out, an electron donor component can be allowed to co-exist, if necessary. The electron donor component is considered to have the effect of stabilizing growing carbon cations and/or the effect of trapping protons in the system in cationic polymerization; the addition of the electron donor produces a polymer in which its molecular weight distribution is narrow and its structure is controlled. The usable electron donor component is not particularly limited; heretofore known ones can be widely used provided that they have donor numbers of 15 to 60. Examples thereof can include pyridines such as α-picoline and di-t-butylpyridine, amines such as triethylamine, amides such as dimethylacetamide, sulfoxides such as dimethylsulfoxide, esters, phosphorus compounds, or metal compounds having oxygen atoms bonded to metal atoms such tetraisopropoxytitanium.

A reaction solvent may be used in the above copolymerization reaction. Examples of the reaction solvent include a single solvent selected from the group consisting of a halogenated hydrocarbon, an aliphatic hydrocarbon, and an aromatic hydrocarbon, or a mixed solvent thereof.

The halogenated hydrocarbon may use chloroform, methylene chloride, 1,1-dichloroethane, 1,2-dichloroethane, n-propyl chloride, n-butyl chloride, 1-chloropropane, 1-chloro-2-methylpropane, 1-chlorobutane, 1-chloro-2-methylbutane, 1-chloro-3-methylbutane, 1-chloro-2,2-dimethylbutane, 1-chloro-3,3-dimethylbutane, 1-chloro-2,3-dimethylbutane, 1-chloropentane, 1-chloro-2-methylpentane, 1-chloro-3-methylpentane, 1-chloro-4-methylpentane, 1-chlorohexane, 1-chloro-2-methylhexane, 1-chloro-3-methylhexane, 1-chloro-4-methylhexane, 1-chloro-5-methylhexane, 1-chloroheptane, 1-chlorooctane, 2-chloropropane, 2-chlorobutane, 2-chloropentane, 2-chlorohexane, 2-chloroheptane, 2-chlorooctane, chlorobenzene, or the like; the solvent selected from among these may be single or one consisting of 2 or more components.

The aliphatic hydrocarbon is preferably propane, butane, pentane, neopentane, hexane, heptane, octane, cyclohexane, methylcyclohexane, or ethylcyclohexane; the solvent selected from among these may be single or one consisting of 2 or more components.

The aromatic hydrocarbon is preferably benzene, toluene, xylene, or ethylbenzene; the solvent selected from among these may be single or one consisting of 2 or more components.

When a reaction solvent is used as the embodiment of the present invention, it is preferable to use the solvent so that the concentration of the resultant polymer is 0.1 to 80% by weight, considering the solubility of the polymer, the viscosity of the solution and ease of heat removal; it is more preferable to use the solvent so as to provide a polymer concentration of 1 to 50% by weight in view of production efficiency and ease of operation. The monomer concentration in polymerization is preferably on the order of 0.1 to 8 moles/litter, more preferably on the order of 0.5 to 5 moles/litter. The usage amount of the organic solvent in polymerization is preferably 0.5- to 100-fold that of the monomer used, in view of suitably controlling viscosity and heat generation.

The various raw materials used in the present invention may be ones available industrially or experimentally; however, because when substances having active hydrogen such as water, alcohol and hydrochloric acid and compounds having chlorine atoms bonded to the tertiary carbons other than the initiator are contained in the raw materials, these substances and compounds become a cause of generating side reactions as impurities; thus, they are required to be purified to the lowest possible concentration. It is also necessary to prevent the entering of these impurities from the outside during reaction operation. To efficiently obtain a desired polymer, it is preferable to reduce the total mole number of impurities to 1-fold or less, more preferably 0.5-fold or less, that of the total number of initiation point of polymerization in the initiator.

The above copolymerization reaction is preferably performed under an atmosphere of an inert gas such as nitrogen, argon, or helium. For pressure during the copolymerization, any condition such as ordinary pressure or pressurization may be adopted considering the type of the monomers, the type of the solvent, the polymerization temperature, and the like. The copolymerization is preferably performed under thorough stirring conditions so that the polymerization system is homogeneous. The copolymerization reaction according to the present invention can be performed, for example, by a batch or semi-batch method which involves sequentially charging a polymerization solvent, isobutylene, a vinyl ether represented by the formula (5), a catalyst, and, if necessary, an initiator and chain transfer agent and the like into one reaction vessel. Alternatively, it may be conducted by a continuous method which involves performing reaction while continuously charging a polymerization solvent, monomers, a catalyst, and, if necessary, an initiator and chain transfer agent and the like into the system and further removing the resultant. The batch method is preferable in that the concentration of the polymerization catalyst at the starting point of polymerization and during polymerization can be easily controlled.

Because the polymerization temperature influences the average molecular weight of the isobutylene-based polymer obtained, the polymerization temperature adopted may be properly selected depending on the desired average molecular weight; however, the polymerization temperature is preferably on the order of −80° C. to 20° C., more preferably on the order of −70° C. to 0° C., and the polymerization time is typically on the order of 0.5 to 180 minutes, preferably on the order of 20 to 150 minutes.

According to the production method of the present invention, the polymerization reaction is preferably terminated by the addition of an alcohol such as methanol in view of ease of subsequent handling; however, the means for the termination thereof is not particularly limited thereto, any of the conventional means in common use may be applied, and there is even no special need to perform termination reaction.

The form of the reactor used in the present invention is not particularly limited; however, it is preferably a stirring tank-type reactor. The structure thereof is not particularly limited; however, for example, it is preferably a structure permitting cooling in a jacket part and enabling monomers and a catalyst and an electron-donating agent which are both sequentially supplied to be uniformly mixed and reacted. It may also be a structure in which incidental equipment is provided such as an internal cooling coil and a reflux condenser to enhance cooling capacity and a baffle plate can be provided to render the mixed state satisfactory. The stirring blade used in the stirring tank-type reactor is not particularly limited; however, it is preferably high in the performance of circulating and mixing a reaction solution in the vertical direction, and there are suitably used a stirring blade such as a (multistage) pitched paddle blade and a turbine blade in a relatively low viscosity region of the polymerization/reaction solution of several centipoises, a large blade having a large bottom paddle such as a Maxblend blade, a Fullzone blade, a Sunmeller blade, a Hi-F Mixer blade and a blade as described in Japanese Patent Application Laid-Open No. 10-24230 in a middle viscosity region of several tens of centipoises to several hundreds of poises, and an anchor blade, a (double) helical ribbon blade, a logborn blade, or the like in a high viscosity region of more than several hundreds of poises.

The isobutylene-based polymer of the present invention has sufficient cross-linking curability because it comprises a structural unit represented by the above formula (1) and a structural unit represented by the above formula (2). Thus, the isobutylene-based polymer of the present invention is useful in introducing a polyisobutylene skeleton into a composition of rubber and the like.

EXAMPLES

The present invention is more specifically described below based on Examples and Comparative Examples. However, the invention is not intended to be limited to the following Examples in any manner.

Production Example 1

Synthesis of Tricyclodecene Vinyl Ether

Tricyclodecene vinyl ether was synthesized according to the following scheme.

[Chemical Formula 7]

Specifically, 186.47 g (1.24 mol) of tricyclodecene monool (a mixture of isomers (6-a) and (6-b)), 7.56 g (10 mol %) of potassium hydroxide, and 454.35 g of 1,3-dimethylimidazolidinone (DMI) were introduced into a glass flask and reacted at 120° C. under reduced pressure (40 mmHg). This reaction solution was introduced into a stainless autoclave and reacted under an atmosphere of acetylene at 0.02 MPa, at 140° C. for 5 hours. After recovering the reaction solution and distilling off the solvent, the residue was extracted with hexane/methanol/water, followed by recovering the hexane phase. The hexane phase was dried with anhydrous sodium sulfate, filtered off, and dried under reduced pressure to provide 192.32 g of crude tricyclodecene vinyl ether. In addition, it was distilled and purified to provide 155.17 g of the desired tricyclodecene vinyl ether (a mixture of isomers (7-a) and (7-b)).

Example 1

Synthesis of Isobutylene-Based Polymer

According to the following procedure, an isobutylene-based polymer was synthesized which comprises a structural unit represented by the following formula (1):

[Chemical Formula 8]

(1)

a structural unit represented by the following formula (8-a):

[Chemical Formula 9]

(8-a)

and a structural unit represented by the following formula (8-b):

[Chemical Formula 10]

(8-b)

A 300-mL 3-neck flask was equipped with a septum cap, a reflux tube having a vacuum line connected, and a temperature tube; a stirrer bar was placed therein; and using the vacuum line (with a Schlenk tube), the inside of the system was subjected to two times repeated deaeration—replacement with nitrogen and thereby set under an atmosphere of nitrogen at normal pressure. Into the flask, 34.8 g of a toluene solvent dried with calcium hydride and distilled was injected through the septum cap using a syringe.

Using a syringe, 5.68 mmol of tricyclodecene vinyl ether (from Maruzen Petrochemical Co., Ltd.) was then injected. The flask was immersed in a cryostat at a predetermined temperature, and it was confirmed that the solution temperature inside the system had reached the predetermined temperature, followed by transferring 51.2 mmol of isobutylene to the reaction system. Once the solution temperature inside the system had well reached the predetermined temperature described in Table 1, a prepared catalyst solution in which a 1.06 mol/L ethyl aluminum dichloride (EADC)/n-hexane solution was diluted 1:10 with purified hexane (1.14 mmol as ethyl aluminum dichloride) was weighed using a syringe in a glove box under a nitrogen atmosphere and injected into the reactor.

Two hours after the catalyst solution injection, the cryostat was removed from the flask, which was then allowed to stand to room temperature. The reaction mixture was subjected to extraction operation with a 1N sodium hydroxide solution (2 times), followed by subjecting the resultant oil phase to extraction operation with pure water. After confirming that the pH of the aqueous phase side had become neutral, the oil phase was subjected to the distillation off of the solvent with an evaporator, followed by drying the residue using a vacuum dryer at 1 mmHg and 60° C. for 12 hours to provide 2.41 g of a desired isobutylene-based polymer (a copolymer of isobutylene and tricyclodecene vinyl ether).

It was confirmed by $^{13}$C-NMR measurement that the resultant substance was the desired isobutylene-based polymer (the copolymer of isobutylene and tricyclodecene vinyl ether).

Examples 2 to 5

Isobutylene-based polymers were produced and evaluated in the same way as in Example 1 except that the charge ratio between isobutylene and tricyclodecene vinyl ether, the EADC catalyst amount, and the reaction temperature were changed as shown in Table 1.

Comparative Example 1

An isobutylene homopolymer was produced and evaluated in the same way as in Example 1 except that tricyclodecene vinyl ether was not used and the EADC catalyst amount and the reaction temperature were changed as shown in Table 1.

[$^{13}$C-NMR Measurement]

$^{13}$C-NMR measurement was performed for the isobutylene-based polymer of each of Examples 1 to 5. Specifically, each isobutylene-based polymer was dissolved in deuterochloroform and measured using VNMRS-500 from Varian. Tetramethylsilane as an internal standard substance was used for the calibration of the chemical shift. The copolymerization ratios determined by $^{13}$C-NMR measurement were shown in Table 1.

Figure 1:
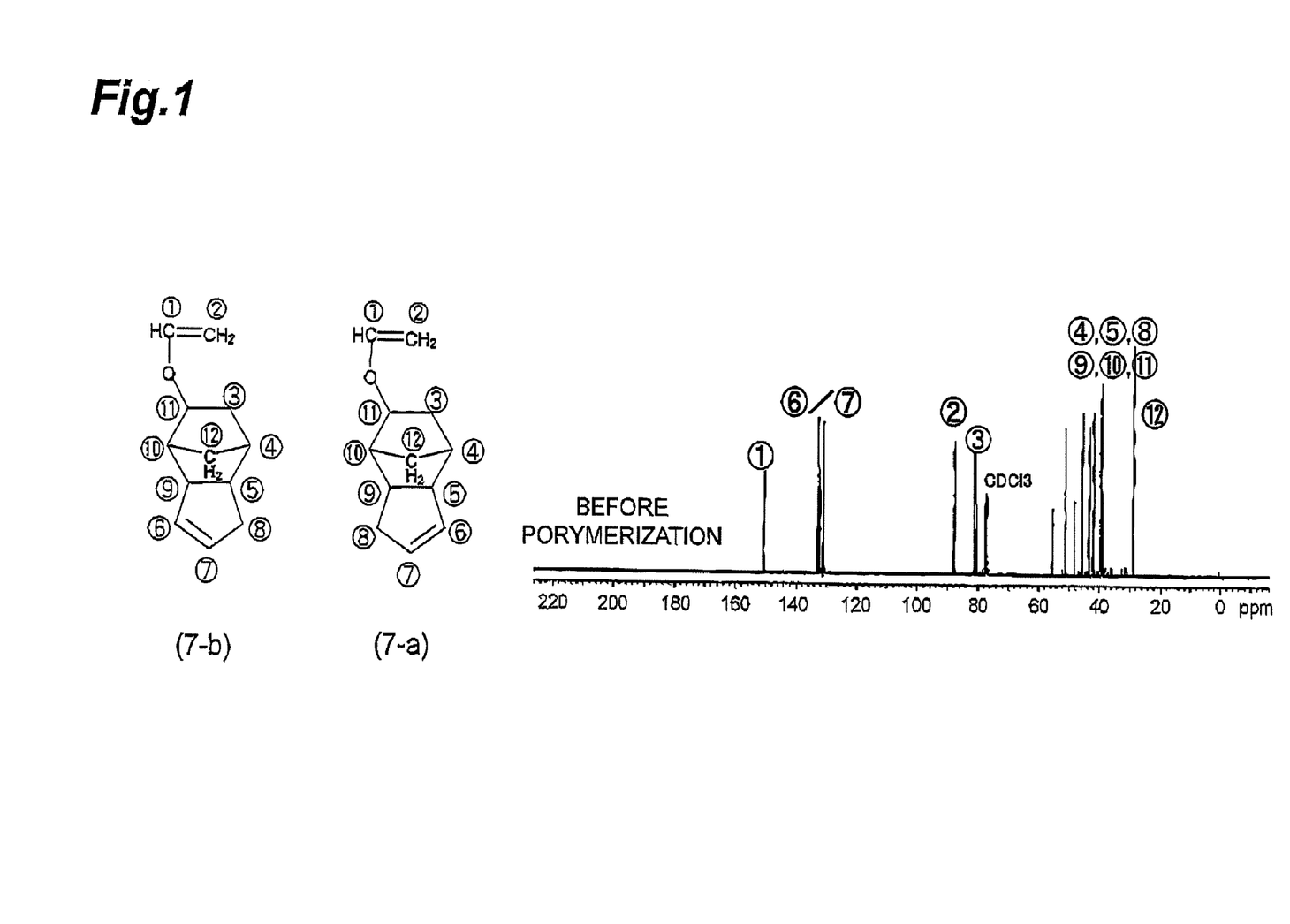
FIG. 1 is a chart showing a $^{13}$C-NMR spectrum before copolymerization reaction in Example 1.
Figure 2:
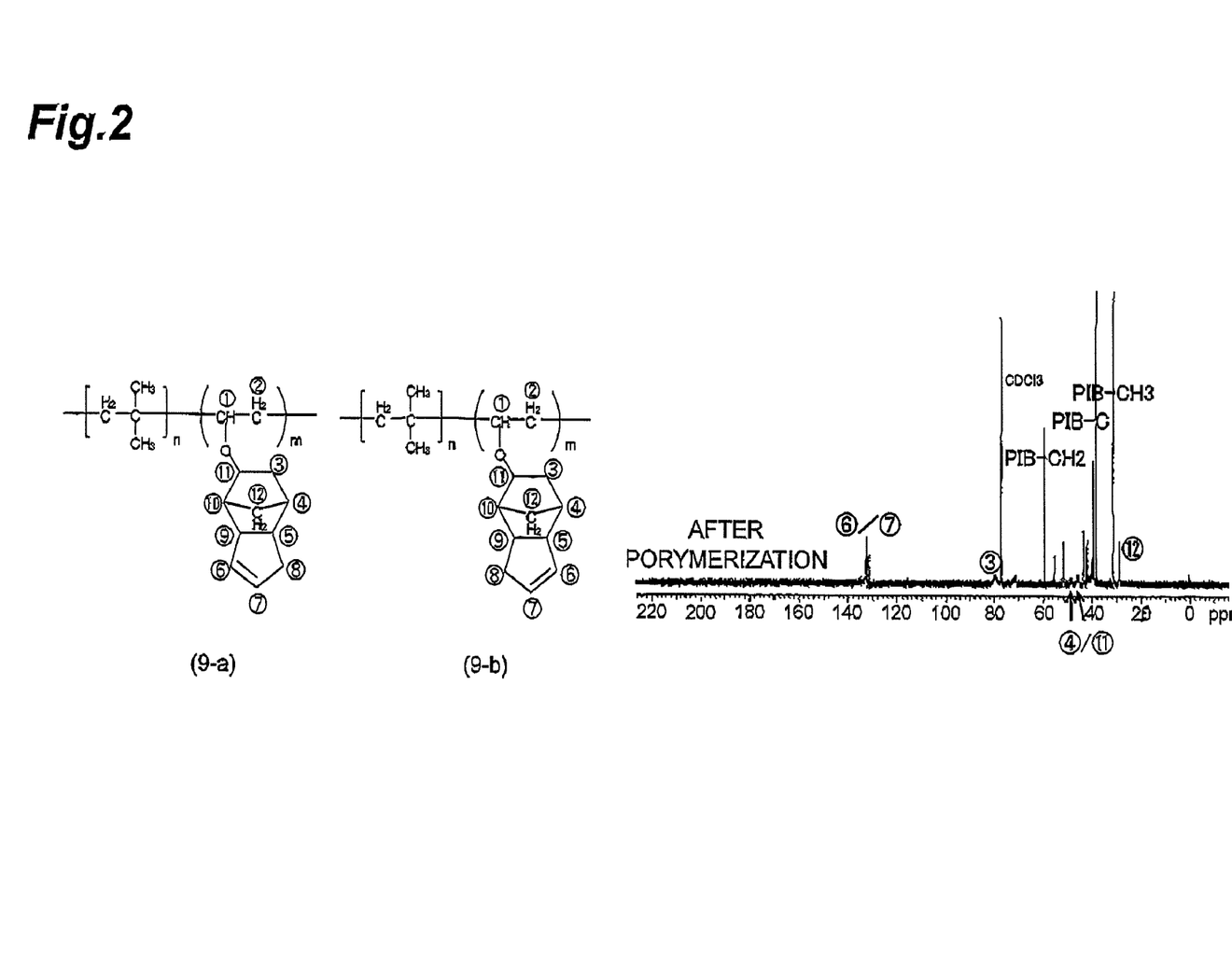
FIG. 2 is a chart showing a $^{13}$C-NMR spectrum for the isobutylene-based polymer obtained in Example 1.

A $^{13}$C-NMR spectrum before the copolymerization reaction of Example 1 was shown in FIG. 1, and a $^{13}$C-NMR spectrum of the resultant isobutylene-based polymer was shown in FIG. 2.

For reference, the relationship between peaks in the $^{13}$C-NMR spectrum and carbons in the formulas (7-a) and (7-b) is shown in FIG. 1, and the relationship between peaks in the $^{13}$C-NMR spectrum and carbons in formulas (9-a) and (9-b) is shown in FIG. 2. The formula (9-a) or (9-b) is a copolymer chain of a structural unit represented by the above formula (1) and a structural unit represented by the above formula (8-a) or (8-b), and these copolymer chains can be present in one molecule of each isobutylene-based polymer.

[GPC Measurement]

GPC measurement was performed for the isobutylene-based polymers of Examples 1 to 5 and the isobutylene homopolymer of Comparative Example 1. Specifically, each compound is dissolved in tetrahydrofuran, and the GPC measurement was performed using 8020 GPC System from Tosoh Corporation, in which TSK-GEL, Super H1000, SuperH2000, SuperH3000, and SuperH4000 were connected in series with tetrahydrofuran used as an eluting solution. Polystyrene standard was used in the calibration of molecular weight. The weight average molecular weights of each isobutylene-based polymer and the isobutylene homopolymer determined by GPC measurement are shown in Table 1.

[Measurement of Glass-Transition Temperature]

The glass-transition temperature was measured for the isobutylene-based polymers of Examples 1 to 5 and the isobutylene homopolymer of Comparative Example 1. Specifically, the measurement was carried out in duplicate in the temperature range of −100 to 230° C. at a rate of temperature rise of 20° C./minute under a nitrogen atmosphere using Diamond DSC from Perkin-Elmer. The glass-transition temperature of a sample of interest was defined as the second detected temperature.

[Sulfur-Cross-Linkability Test]

Based on viscosity changes in measuring dynamic viscoelasticity at a constant temperature, sulfur-cross-linkability was evaluated for the isobutylene-based polymers of Examples 1 to 5 and the isobutylene homopolymer of Comparative Example 1. The dynamic viscoelasticity measurement used the apparatus DAR-50 from Reologica Instruments AB. The following blends were each mounted in the measuring apparatus; each blend was heated up from 100° C. to 160° C. at 2° C./minute; and it was tracked for the behavior of shear viscosity at each temperature while being allowed to stand for 30 minutes after reaching 160° C. The shear viscosity was given under conditions of a frequency of 1 Hz and a strain of 10%.

In the case of the isobutylene-based polymers of Examples 1 to 5, a phenomenon was observed in which the viscosity sharply increased at a predetermined temperature. The viscosity increase-starting temperature of each isobutylene-based polymer is shown in Table 1. In the case of the isobutylene homopolymer, no viscosity increase was observed in the temperature region measured.

TABLE 1

|  | Example 1 | Example 2 | Example 3 | Example 4 | Example 5 | Comparative Example 1 |
|---|---|---|---|---|---|---|
| Charge Ratio (Molar Ratio) of Isobutylene/Vinyl Ether | 90/10 | 95/5 | 95/5 | 60/40 | 30/70 | 100/0 |
| EADC Catalyst Amount (% by Mass Based on Monomer) | 2.0 | 1.0 | 2.0 | 1.2 | 1.8 | 1.8 |
| Reaction Temperature (° C.) | −70 | −18 | −20 | −13 | −25 | −20 |
| Copolymerization Introduction Ratio ($^{13}$C-NMR) | 80/20 | 85/15 | 92/8 | 52/48 | 25/75 | 100/0 |
| GPC-Mw | 23600 | 13400 | 15400 | 35800 | 15400 | 21600 |
| Glass-Transition Temperature (° C.) | 93 | 47 | 56 | 98 | 105 | −71 |
| Sulfur-Cross-linkability Test (Viscosity Increase-Starting Temperature(° C.)) | 160 | 159 | 160 | 158 | 158 | Not Found |

Example 6

Using a methanol complex of boron trifluoride (BF$_3$.MeOH complex with a BF$_3$ content of 67% by mass) as a catalyst, 0.1 mol/hr of tricyclodecene vinyl ether and 2.7 mol/hr of isobutylene (isobutylene/vinyl ether=95/5) were reacted for 5 hours under conditions of a reaction pressure of 0.3 MPa and a reaction temperature of −30° C. while being continuously flowed.

When the reaction mixture was poured into methanol, a white sticky compound was precipitated. The sticky compound was isolated by removing methanol by decantation and dried using a vacuum dryer at 1 mmHg and 60° C. for 12 hours to provide a pale yellow transparent sticky substance.

The resultant transparent sticky substance was subjected to $^{13}$C-NMR measurement to confirm that the resultant transparent sticky substance was a desired isobutylene-based polymer (a copolymer of isobutylene and tricyclodecene vinyl ether).

Example 7

An isobutylene-based polymer was obtained in the same way as in Example 6 except that the reaction temperature was set at −27° C.

Example 8

An isobutylene-based polymer was obtained in the same way as in Example 6 except that the reaction temperature was set at −20° C.

Example 9

A 300-mL 3-neck flask was equipped with a septum cap, a reflux tube having a vacuum line connected, and a temperature tube; a stirrer bar was placed therein; and using the vacuum line (with a Schlenk tube), the inside of the system was subjected to two times repeated deaeration—replacement with nitrogen and thereby set under an atmosphere of nitrogen at normal pressure. Into the flask, 14.1 g of dehydrated toluene (from Kanto Chemical Co., Inc.) was injected through the septum cap using a syringe.

Using a syringe, 15.24 g (8.66 mmol) of tricyclodecene vinyl ether (from Maruzen Petrochemical Co., Ltd.) was then injected; the flask was immersed in a cryostat at −20° C.; and it was confirmed that the solution temperature inside the system had reached −20° C. Thereafter, 15.62 g of isobutylene (280 mmol) and 0.11 mL (89.7 mg) of methanol (from Kanto Chemical Co., Inc.) were transferred to the reaction system, and it was again confirmed that the solution temperature inside the system had reached −20° C.

BF$_3$ gas was then transferred from a BF$_3$ gas bomb to a pressure-resistant stainless container with a valve through a pressure-reducing valve, and 0.19 g (2.8 mmol) thereof was weighed out and injected through the septum cap via a stainless cannula.

One hour after the BF$_3$ gas injection, the cryostat was removed from the flask, which was then allowed to stand to room temperature; when the reaction mixture was poured into 500 ml of methanol, a white sticky compound was precipitated. The sticky compound was isolated by removing methanol by decantation and dried using a vacuum dryer at 1 mmHg and 60° C. for 12 hours to provide 0.94 g of a pale yellow transparent sticky substance.

The resultant transparent sticky substance was subjected to $^{13}$C-NMR measurement to confirm that the resultant transparent sticky substance was a desired isobutylene-based polymer (a copolymer of isobutylene and tricyclodecene vinyl ether).

GPC was measured for the isobutylene-based polymers obtained in Examples 6 to 9. The results are shown in Table 2.

TABLE 2

|  | Example 6 | Example 7 | Example 8 | Example 9 |
|---|---|---|---|---|
| Charge Ratio (Molar Ratio) of Isobutylene/Vinyl Ether | 95/5 | 95/5 | 95/5 | 97/3 |
| BF$_3$•MeOH Catalyst Amount (% by Mass Based on Monomer) | 2.7 | 2.7 | 2.7 | — |
| BF$_3$ Catalyst Amount (% by Mass Based on Monomer) | — | — | — | 1.0 |
| Reaction Temperature (° C.) | −30 | −27 | −20 | −20 |
| GPC-Mw | 12000 | 8400 | 4200 | 4600 |

The use of BF$_3$.MeOH catalyst and BF$_3$ catalyst was demonstrated to form isobutylene-based polymers. The reaction temperature could be changed to control the molecular weight. From these results, it was determined that the BF$_3$.MeOH catalyst and BF$_3$ catalyst were catalysts suitable for producing the isobutylene-based polymer according to the present invention.

The invention claimed is:

1. An isobutylene-based polymer comprising a structural unit represented by the following formula (1):

[Chemical Formula 1]

(1)

and a structural unit represented by the following formula (2):

[Chemical Formula 2]

(2)

wherein X represents a divalent group; Y represents a substituted or unsubstituted alicyclic group having an unsaturated bond in the ring; and n represents 0 or 1.

2. The isobutylene-based polymer according to claim 1, wherein a weight average molecular weight thereof is 500 to 500,000.

3. The isobutylene-based polymer according to claim 1, wherein the polymer contains substantially no unsaturated bond in the main chain.

4. The isobutylene-based polymer according to claim 1, wherein the polymer has a random copolymer chain of a structural unit represented by the formula (1) and a structural unit represented by the formula (2).

5. The isobutylene-based polymer according to claim 1, wherein the polymer comprises a structural unit represented by the following formula (3):

[Chemical Formula 3]

(3)

wherein n represents 0 or 1, and/or a structural unit represented by the following formula (4):

[Chemical Formula 4]

(4)

wherein n represents 0 or 1, as the structural unit represented by the formula (2).

6. A method for producing an isobutylene-based polymer, comprising copolymerizing isobutylene and a cationically polymerizable monomer containing a vinyl ether represented by formula (5):

$$CH_2=CH-O-(X)_n-Y, \quad (5)$$

wherein X represents a divalent group; Y represents a substituted or unsubstituted alicyclic group having an unsaturated bond in the ring; and n represents 0 or 1, in the presence of a Lewis acid to provide an isobutylene-based polymer comprising a structural unit represented by the following formula (1):

[Chemical Formula 5]

(1)

and a structural unit represented by the following formula (2):

[Chemical Formula 6]

(2)

wherein X represents a divalent group; Y represents a substituted or unsubstituted alicyclic group having an unsaturated bond in the ring; and n represents 0 or 1.

7. The method according to claim 6, wherein the Lewis acid is boron trifluoride or a boron trifluoride complex.

* * * * *